(12) United States Patent
Null et al.

(10) Patent No.: US 6,419,424 B1
(45) Date of Patent: Jul. 16, 2002

(54) COIL PIPE TRAILER

(75) Inventors: Robert L. Null, Willow Wood, OH (US); Robert L. Ronk, Huntington, WV (US); Franklin S. Boggs, Kitts Hill, OH (US); Kendrall P. Waller, Huntington, WV (US)

(73) Assignees: Null's Machine & Mfg., Inc., Huntington; Mountaineer Gas Company, Charleston, both of WV (US)

( * ) Notice: Subject to any disclaimer, the term of this patent is extended or adjusted under 35 U.S.C. 154(b) by 0 days.

(21) Appl. No.: 09/471,888

(22) Filed: Dec. 23, 1999

Related U.S. Application Data

(63) Continuation-in-part of application No. 09/189,661, filed on Nov. 11, 1998, now abandoned.

(51) Int. Cl.⁷ .................. B65H 16/00; B65H 23/00; F16L 1/028
(52) U.S. Cl. .............. 405/174; 405/154.1; 405/156; 405/177; 242/557; 242/566; 242/595.1; 242/615.2
(58) Field of Search .................. 405/154.1, 156, 405/174, 184; 242/557, 566, 615.2, 615.3, 594.1, 595.1; 72/146, 160, 183, 164

(56) References Cited

U.S. PATENT DOCUMENTS

| | | |
|---|---|---|
| 336,899 A | 3/1886 | Davis |
| 1,408,791 A | 3/1922 | Wolffgram |
| 2,293,156 A | 8/1942 | Mason |
| 2,350,274 A | 5/1944 | Duclos |
| 2,392,323 A | 1/1946 | Koss |
| 2,702,937 A | 3/1955 | Smart |
| 3,050,273 A * | 8/1962 | Sounders .................... 242/557 |
| 3,237,438 A | 3/1966 | Esson |

(List continued on next page.)

FOREIGN PATENT DOCUMENTS

JP 55122934 * 9/1980 .................. 405/174

OTHER PUBLICATIONS

Kiefer Industrial, Vertical Coil Pipe Reel Trailer Series IRV, Kiefer Industrial (Ames, Iowa, Apr., 1997).
Kiefer Industrial, Vertical Coil Pipe Reel Trailer Series IRH, Kiefer Industrial (Ames, Iowa, Apr., 1997).
Kiefer Industrial, Vertical Coil Pipe Reel Trailer Series IRE, Kiefer Industrial (Ames, Iowa, Apr., 1997).
McElroy Manufacturing, Inc. Linetamer Operator's Manual, Manual LT0104, (Apr., 1997).
ALH Systems, Inc. 4"/6" Coilpipe Trailer with Rerounding & Curvature Reduction System Operating Manual, Issue 2, Aug., 1997.

Primary Examiner—Thomas B. Will
Assistant Examiner—Jong-Suk Lee
(74) Attorney, Agent, or Firm—King and Schickli PLLC

(57) ABSTRACT

A tailer for transporting coiled pipe and assisting in the unwinding of the pipe for laying in a trench. A support cradle contacts the outer surface of the coil, thereby obviating the need for a reel. The cradle includes self-centering support rollers upon which the coil freely rotates during the pipe laying operation. Horizontal rollers are provided as a retainer for engaging the inner surface of the coil. The position of the retainer rollers is adjustable to accommodate a variety of coil diameters. To remove coil set from the pipe unwinding from the coil, a reforming assembly includes a straightener and rerounder. The pipe reforming assembly is mounted on rollers on the base of the trailer for translating back and forth to track the pipe during unwinding to maintain alignment. The rerounder and straightener are provided with a releasable gate and top portion respectively, to assist in the loading and unloading of the pipe in the reforming assembly. In one embodiment, straightening occurs in the transition from the coil in the cradle to the reforming assembly.

21 Claims, 9 Drawing Sheets

U.S. PATENT DOCUMENTS

| | | |
|---|---|---|
| 3,242,566 A | 3/1966 | White |
| 3,266,280 A | 8/1966 | Wiig |
| 3,282,304 A | 11/1966 | Coleman |
| 3,410,126 A | 11/1968 | Baker |
| 3,442,108 A | 5/1969 | Muller |
| 3,712,100 A | 1/1973 | Key et al. |
| 3,855,835 A | 12/1974 | Tisdale, III et al. |
| 3,872,680 A | 3/1975 | Nicholson et al. |
| 3,889,831 A * | 6/1975 | Davis .................. 242/595.1 X |
| 3,965,713 A | 6/1976 | Horton |
| 3,982,402 A * | 9/1976 | Lang et al. ............. 242/566 X |
| 4,056,958 A | 11/1977 | Fangmeier et al. |
| 4,095,437 A * | 6/1978 | Cox ........................ 405/168.1 |
| 4,147,046 A | 4/1979 | Blattler |
| 4,148,445 A * | 4/1979 | Reynolds et al. ...... 242/86.5 R |
| 4,157,023 A | 6/1979 | Tisdale et al. |
| 4,201,074 A | 5/1980 | Cox |
| 4,243,345 A | 1/1981 | Cha et al. |
| 4,296,891 A * | 10/1981 | Sidaway et al. ......... 242/574.1 |
| 4,313,694 A | 2/1982 | Cox |
| 4,334,418 A | 6/1982 | Grandell |
| 4,410,297 A * | 10/1983 | Lynch .................... 405/181 X |
| 4,422,596 A * | 12/1983 | Cleavenger ................. 242/129 |
| 4,454,999 A * | 6/1984 | Woodruff .................. 242/388.7 |
| 4,527,639 A | 7/1985 | Dickinson, III et al. |
| 4,534,197 A | 8/1985 | Wooley |
| 4,540,017 A * | 9/1985 | Prange ................ 242/397.1 X |
| 4,871,127 A * | 10/1989 | Clark ........................ 242/364 |
| 4,917,540 A | 4/1990 | Recalde |
| 4,945,938 A * | 8/1990 | Ponsford et al. ........ 242/557 X |
| 4,949,909 A * | 8/1990 | Hatfield ..................... 242/557 |
| 4,990,209 A | 2/1991 | Rakes |
| 5,074,734 A * | 12/1991 | Price et al. ............. 242/557 X |
| 5,129,462 A * | 7/1992 | Mail ...................... 424/557 X |
| 5,139,751 A * | 8/1992 | Mansfield et al. .......... 422/292 |
| 5,156,355 A * | 10/1992 | Wadle .................... 242/566 X |
| 5,527,134 A * | 6/1996 | Recalde .................. 405/168.3 |
| 5,645,784 A * | 7/1997 | McMillan et al. ...... 405/174 X |
| 5,676,009 A * | 10/1997 | Bright et al. ................. 72/161 |
| 5,993,115 A * | 11/1999 | Jensen et al. ............... 405/177 |

\* cited by examiner

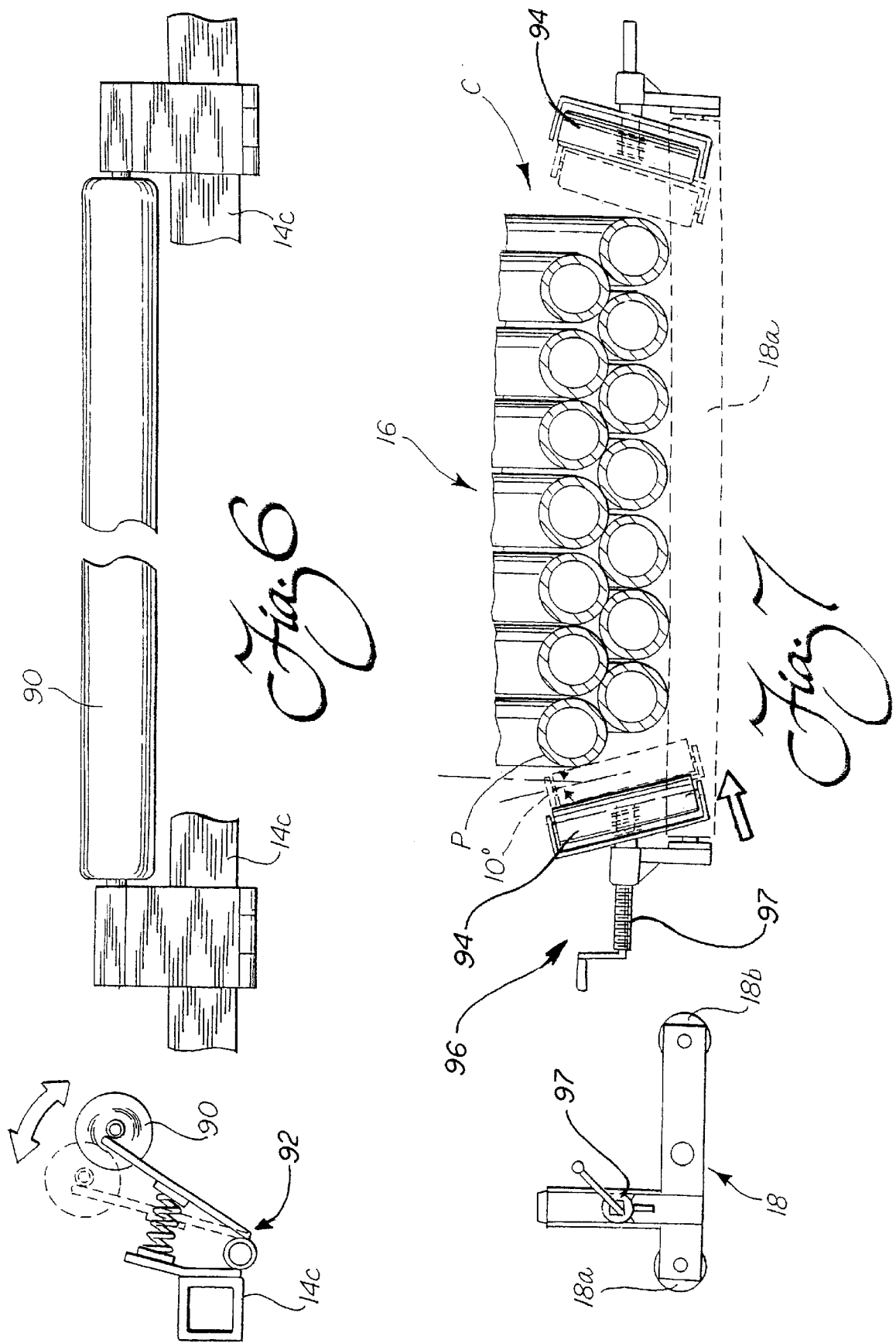

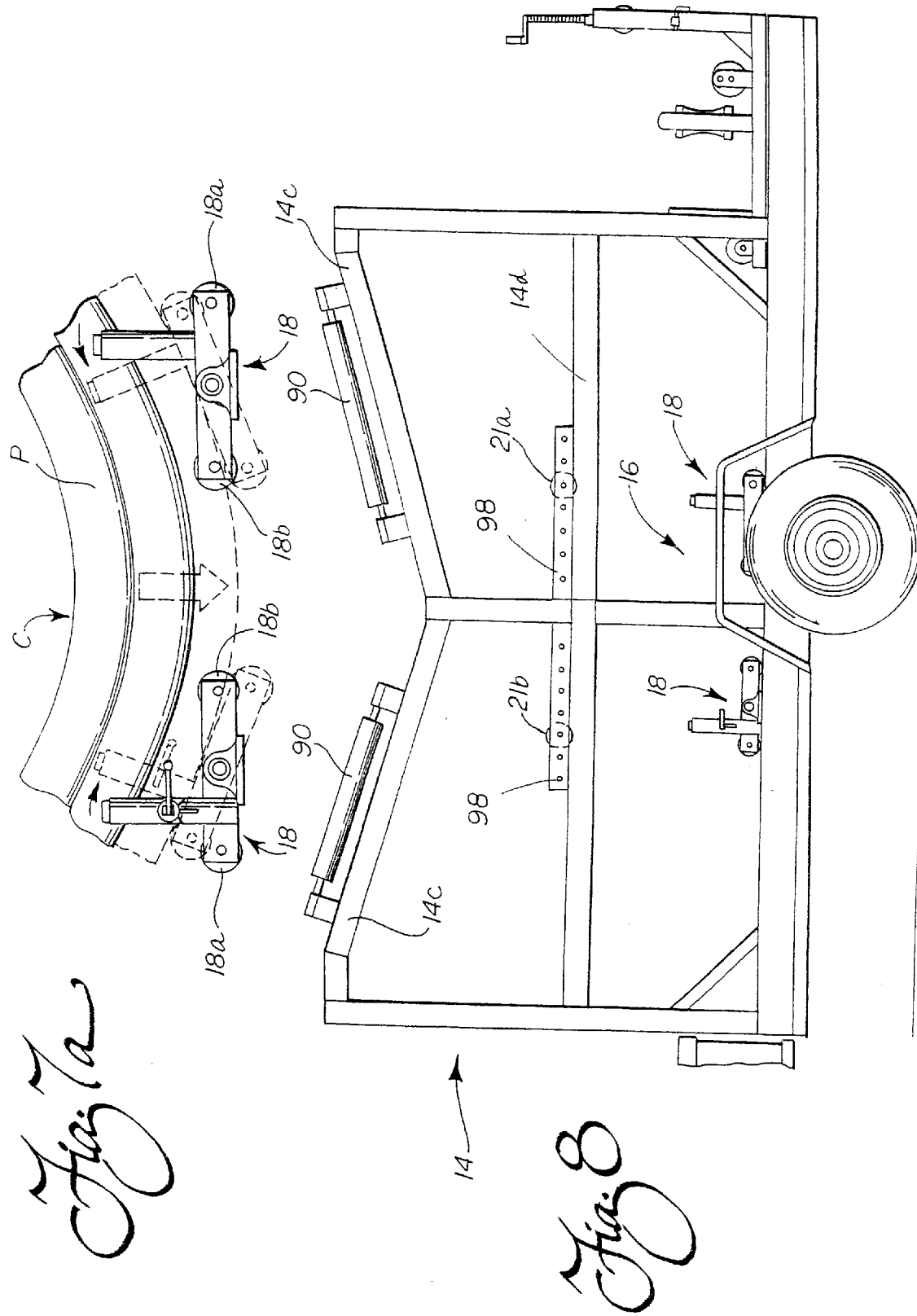

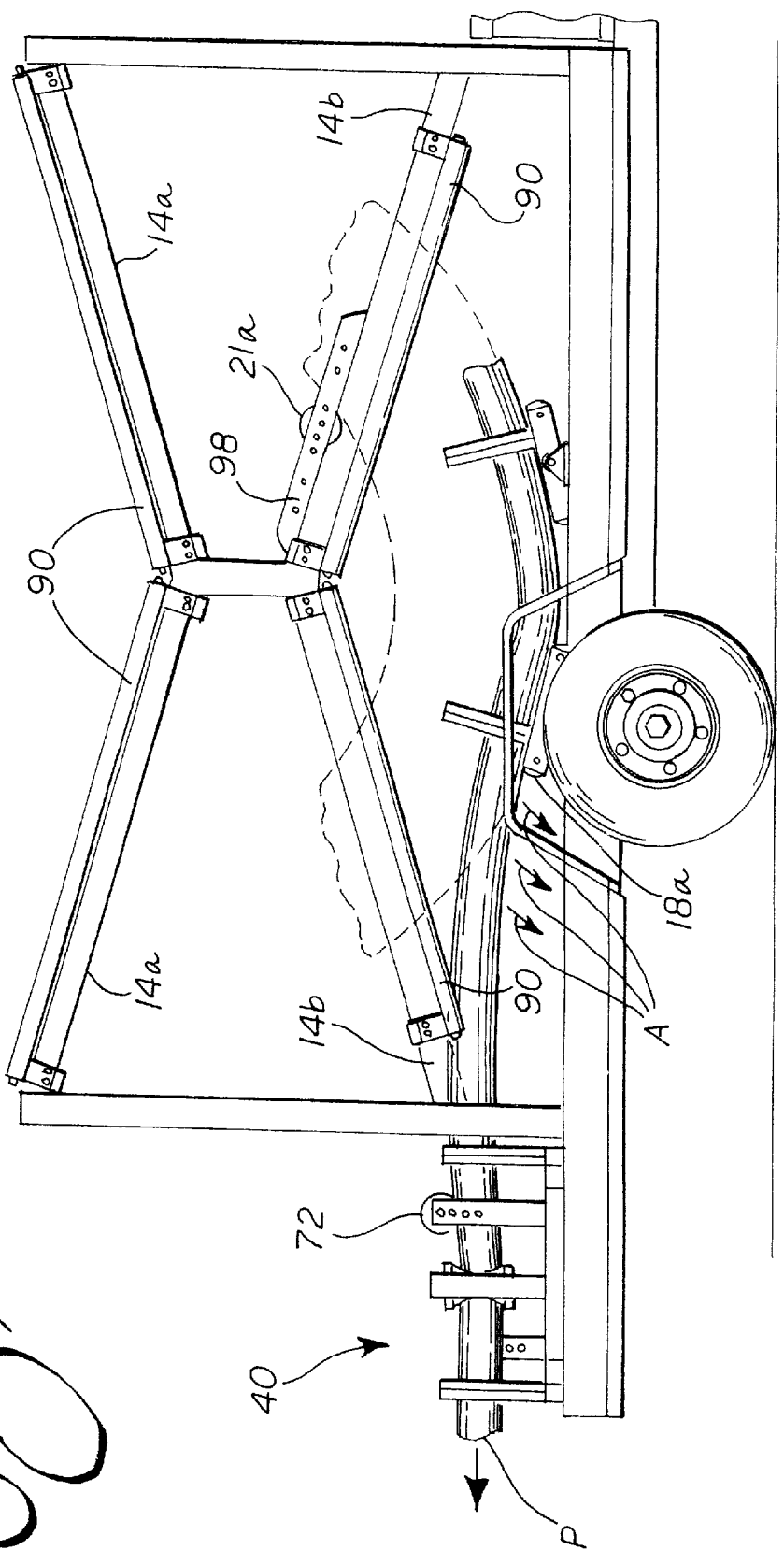

COIL PIPE TRAILER

This is a Continuation-in-Part of application Ser. No. 09/189,661, filed Nov. 11, 1998 now ABN, entitled "Coil Pipe Trailer."

TECHNICAL FIELD

The present invention relates generally to transporting, unwinding and reforming a pipe and, more particularly, to an improved trailer for transporting a pipe coil, straightening and rerounding the pipe, and assisting in unwinding the pipe for laying in a trench.

BACKGROUND OF THE INVENTION

Fluid natural resources are commonly supplied through underground piping. A particularly prevalent use of such pipe is in the natural gas industry. In recent decades, an industry-wide shift has been made away from the use of metal piping, which generally proved unreliable due to corrosion in the underground environment, and toward more reliable types of plastic piping. Initially, this pipe was formed of polyvinyl chloride (PVC) or the like. While the PVC pipe is corrosion resistant, other significant problems were presented by its use. First of all, the inherent rigidity of PVC pipe (also known as "stick pipe") dictates that it is available only in singular, elongate sections. Thus, to create a continuous underground pipeline, the on-site chemical or heat fusion of the ends of adjoining pipe sections is necessary. As should be appreciated, this operation is time consuming, labor intensive and requires specialized chemical or heat welding techniques and highly skilled workers to precisely complete the fusion.

To meet this need and overcome the aforementioned difficulties, there has been a recent shift away from the use of PVC pipe and toward the use of pipe made from other, more durable, flexible polymeric materials, such as, for example, polyethylene. One great advantage resulting from this advancement is the ability to store and deliver the pipe in coils comprised of several hundred, or even thousands, of feet of pipe. This of course makes substantially continuous pipe laying possible with only a few, infrequent interruptions to permit a worker to fuse the ends of adjoining coils together. Thus, as is now widely recognized throughout the industry, flexible polyethylene coil pipe results in a significant time savings over the prior art stick pipe laying operation, reduces the incidence of joint defects or failure due to the low number of fusion sites, and is also more durable in the underground environment.

Notwithstanding these vast improvements over the prior art metal and PVC piping, the use of flexible coil pipe is not without limitations. Perhaps the most significant limitation is the absence of an effective device for both transporting the coil to the work site and assisting in laying the pipe from the coil into a trench. Indeed, most minor repair jobs or branch lines require only one coil of pipe, or a portion of a coil, for completion. In these incidences, it is even more desirable to provide a device for efficiently transporting the coil from place to place, as well as to complete the pipe laying as necessary, without the need for support equipment.

Also, we have found that virtually all prior art transportation devices rely on a reel or spool to support the coil on the trailer or other vehicle. This arrangement is troublesome for several reasons. First of all, to avoid the additional expense associated with selling pipe pre-wound on such reels, the coil must be loaded onto the reel by the pipe laying contractor. As should be appreciated, this extra operation requires a significant amount of effort and time. The troublesome nature of the use of reels is compounded when it is considered that flexible pipe comes pre-coiled in a number of different diameters, depending on the size (cross-sectional diameter) of the pipe. Thus, in some prior art devices in order to accommodate the various diameters of coil, a number of different size reels must be made available by the manufacturer. Additionally, it has been our experience that reels tend to allow the coil to shift back and forth in an uncontrolled fashion, especially when the end of the pipe approaches. This increases the chance that the coil can become tangled or hung up on the reel and cause deleterious binding, which of course requires substantial downtime to correct.

And inherent problem characterizing the use of flexible plastic pipe is the tendency of the pipe itself to change shape when it is formed into the coil, especially after resting in a coiled position for an extended time. More particularly, the bending into the coil causes the pipe to assume a degree of curvature in the longitudinal direction, as well as an ovalness in cross-section. This deformation is sometimes referred to as "coil set." As can readily be appreciated, the curvature and ovalness makes the pipe difficult to control during unwinding. Such flexible pipe has a good memory and, thus, there is a tendency for the pipe to backlash to the original coiled position and maintain its oval shape during unwinding. Obviously, to make the pipe lay in the trench, it must be straightened, and to maintain the maximum cross sectional area it must be rerounded. If the pipe is not so properly and accurately reformed, this coil set would make it difficult to mate the ends of two adjoining coils of pipe for fusion. This is because the ends to be mated would tend to be at a slight angle to each other, and they would likely have slightly different degrees of roundness.

There have been attempts in the past to successfully combine straightening and rerounding of plastic pipe as it is being unwound from the reel or the like in analogous applications. For example, in U.S. Pat. No. 4,095,437 to Cox, an apparatus is provided having a plurality of opposed roller pairs alternatively mounted in upright and transverse positions to contact and straighten/reround pipe. Another example is shown in U.S. Pat. No. 4,527,639 to Dickinson, III, et al., which discloses a device for removing the curvature and ovalness from drill pipe that extends through a curved passage in a bore hole that changes directions.

A more recently proposed apparatus particularly tailored for use with flexible coils of polyethylene pipe is described in U.S. Pat. No. 5,676,009 to Bright et al. and assigned to Chevron. The '009 patent provides for a combined straightener and rerounder device that is towed behind a truck carrying a pipe coil. The device includes a set of straightener rollers to first remove the curvature, and then a set of side pressure rollers to remove the ovalness from the pipe. Although straightening and rerounding is achieved, other noteworthy limitations create problems. First of all, because the straightener/rerounder device remains in a fixed position behind the trailer, it can not track the pipe unwinding from the coil. This shortcoming can lead to the creation of deleterious pinch points and binding as the pipe is pulled from the periphery of the coil to the center fixed inlet of the device. In addition, loading of the pipe into the straightener requires a significant amount of time and effort. One or more workers must wrestle the end of the pipe and insert is over and under offset straightener rollers and then through separate rerounder rollers. It should also be recognized that the device does not itself carry the pipe coil and, thus this results in having to have a support a piece of equipment (truck or separate trailer) remain at the work site during the pipe laying operation.

Therefore, as should be appreciated from reviewing the foregoing description of the prior art, a need is identified for an improved trailer that both transports a coil of pipe to a work site and assists in laying the pipe from the coil into a trench. The trailer would eliminate the need for a reel or spool for supporting the coil, yet should provide proper support for the coil to ensure smooth rotation during the pipe laying operation. Adaptability for use with different diameters of coils would also be provided. In addition, the trailer would permit loading of the coil in an efficient and substantially effortless manner. To remove curvature and ovalness from the pipe unwinding from the coil, an improved on-board straightener/rerounder would also be provided that tracks the pipe during unwinding to more efficiently guide the pipe into the trench and reduce the tendency for binding during the pay-out. Overall, the trailer would significantly enhance the ease and efficiency of transporting and laying the pipe coil and at a significantly lower initial cost.

SUMMARY OF THE INVENTION

With the above needs in mind, it is a primary object of the present invention to provide an improved trailer that transports and assists in unwinding pipe from a coil for laying in a trench that overcomes the above-described limitations and disadvantages of the prior art.

Another object of the invention is to provide an improved coil pipe trailer with a cradle for contacting an outer surface of and supporting the coil, thereby avoiding the need for a separate reel or spool.

Still another object of the present invention is to provide an improved coil pipe trailer that includes at least one retainer for engaging an inner surface of the coil during the pipe laying operation, the retainer(s) being adjustable to accommodate a variety of sizes of coil.

A further object of the present invention is to provide a pipe trailer with a releasable gate for providing full access to the support cradle and the retainer(s), thereby permitting easy loading of the coil onto the trailer for transportation or unwinding.

Yet another object of the present invention is to provide a pipe trailer with an on-board straightener and rerounder for reforming the pipe to the curvature and ovalness from the pipe unwinding from the coil.

Still a further object of the present invention is to provide a pipe trailer wherein the straightener/rerounder is mounted for translational movement such that it tracks the pipe as unwinding occurs, thereby avoiding the creation of pinch points that tend to cause binding as the pipe is pulled from the periphery of the coil, and thus erratic pay-out of the pipe.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved trailer for transporting coiled pipe and assisting in laying the pipe into a trench is provided. The hallmarks of the improved trailer are the improved support means that avoid the need for the reel to support the coil, as is characteristic of prior art trailers, and the provision of an on board reforming assembly having a unique straightener/rerounder that tracks the pipe unwinding from the coil to ensure smooth pipe pay-out. The pipe is also easily threaded through the reformer assembly to minimize the initial set-up time. In addition, provision is made for easy loading of coil on to the trailer through a swing out gate. Advantageously, this combination of features provides for the first time a significant increase in the ease and efficiency of the pipe transporting and laying operation, and does so at an overall lower initial cost.

More particularly in the preferred embodiment, support for the coil is provided by a cradle adjacent to a base forming the main body of the trailer. The cradle includes means for rotatably supporting the coil on its outer surface. Specifically, the cradle includes a pair of spaced support roller assemblies for contacting the outer surface of the coil as it freely sits in the trailer. A frame attached to said base supports a pair of upper retainer rollers for engaging the inner surface of the coil. To ensure that the support and retainer rollers can accommodate different sizes of coils, both are adjustable. More specifically, the support roller assemblies are pivotally mounted on the base to provide self-centering action for contacting the outer surface of any size standard coil. The retainer rollers are slidably mounted on the frame and held in place using manually operable locking pins. Together, these combined support and retainer rollers advantageously allow the coil to freely sit in the cradle and rotate during the pipe laying operation, thus avoiding the need for a troublesome reel or spool that is characteristic of prior art trailers. The automatic positioning of the self-centering roller assemblies and the manual release features of the retainer rollers also avoid the need for use of tools and/or other time consuming operations to complete the loading of the coil onto the trailer.

Also in the preferred embodiment disclosed, the unique straightener/rerounder of the pipe reforming assembly adds significantly to the efficiency of operation. As a first step in straightening, the pipe is forced downwardly as it leaves the coil against an initial horizontal bending roller. Adjacent vertical guide rollers keep the pipe centered in the concave face of the bending roller and direct the pipe further along the reforming assembly. The rerounder has a pair of opposed upstanding rollers for applying a combined vertical holding and horizontal compressive force to the pipe. This component provides the next step in straightening, as well as providing the full operation of removing ovalness. One of the upstanding rollers is selectively adjustable to vary the compressive force applied to the pipe. Downstream of these upstanding rollers in the preferred embodiment is a second horizontal bending roller leading into an adjustable pipe deflection assembly for final straightening. The deflection assembly includes an upper roller that is manually adjustable for contacting and varying the vertical deflection of the pipe relative to said second bending roller. Advantageously, these combined elements of the straightener create a backbend in the pipe that reverses the bending moment memorized by the pipe during its initial forming into a coil and during storage. In an alternative construction, the straightener includes a single horizontal bending roller that contacts the upper surface of the pipe as it transitions from the cradle to the rerounder reforming assembly, which avoids the need for the deflection assembly.

To facilitate loading of the pipe in the reforming assembly, the rerounder and deflection assembly are provided with easy release features. More particularly, the rerounder is provided with a releasable top gate which pivots upwardly to permit loading of the pipe coming from the first horizontal roller between the upstanding rollers. The pipe is then passed over the second horizontal roller and into the deflection assembly, which includes a fully releasable top portion that supports the upper roller.

In accordance with another important aspect of the invention, the pipe reforming assembly is carried on board the trailer. In the preferred embodiment, the reforming assembly is positioned so as to receive the pipe unwinding from the rear of the trailer. To avoid the creation of deleterious binding as the pipe is unwound, the reforming assembly is mounted such that it translates back and forth along the base. Thus, as the pipe moves across the coil during unwinding, the reforming assembly floats back and forth along the base tracking this motion. The concave face of the first horizontal bending roller and the pair of vertical guide rollers mounted adjacent the coil greatly assist in efficiently transferring the reciprocal motion of the uncoiling pipe to the reforming assembly. This feature results in a significant enhancement in the smoothness of the unwinding operation, and avoids deleterious binding and the associated downtime for correction.

Another important aspect of the present invention is the ease of both loading the coil into the trailer and feeding the pipe through the reforming assembly. Briefly describing the loading process, the frame includes a swing out gate that provides full access to the cradle and retainer rollers. The coil is lifted using a forklift, or other suitable means, and placed on the roller assemblies forming the cradle. These roller assemblies automatically pivot into place in response to the contact with the outer surface of the coil. The gate is then closed and the retainer rollers are moved into position and locked in place using the manually operable locking pins. The coil now freely sits in the trailer and is free to rotate to pay out the pipe.

To facilitate the placement of the pipe in the reforming assembly, the upper portion of the deflection assembly and the gate of the rerounder are released from the operative position. The free end of the pipe is pulled from the coil and placed over the initial horizontal bending roller and through the vertical guide rollers. Next, the pipe is passed through the open gate and between the opposed upstanding rollers of the rerounder. This leads the pipe to be positioned over the second horizontal bending roller, and onto the lower roller of the deflection assembly. The gate of the rerounder and the top portion of the deflection assembly with its upper roller are then both closed. Once the pipe is fully fed through the reforming assembly, the amount of compressive force applied by the rerounder and the amount of vertical deflection created between the second bending roller/deflection assembly are adjusted by the operator. With these few steps and relatively little effort, the pipe unwinding, reforming and laying operation is ready to begin. The key point is the avoidance of the troublesome, complicated reels of the prior art. The apparatus of the present invention advantageously allows for the entire loading operation to be completed in a matter of minutes and with minimum effort by the operator.

In addition to the support and retainer rollers, the trailer is also equipped with a plurality of bumper rollers for contacting the periphery of the coil during rotation. Preferably, the bumper rollers are mounted on the horizontal and vertical members of the frame in a direction perpendicular to the axis of rotation of the coil. These rollers serve the dual function of assisting the coil in smoothly rotating and lessening any frictional drag force that would otherwise result from contact between the sides of the coil and the frame members.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTON OF THE DRAWINGS

The accompanying drawings incorporated in and forming a part of the specification illustrate several aspects of the present invention and, together with the description, serve to explain the principles of the invention. In the drawings:

FIG. 6 shows, somewhat schematically, an alternative construction in which the top rollers are spring loaded to provide constant support;

FIG. 7 shows, somewhat schematically, an alternative construction in which a vertical squeezer has been added to prevent the pipe from slipping off the coil near the bottom of the coil;

FIG. 7a is a side view of the cradle construction according to FIG. 7 arranged to support a coil;

FIG. 8 shows, somewhat schematically, a side view of an alternative construction of the trailer.

Figure 10:
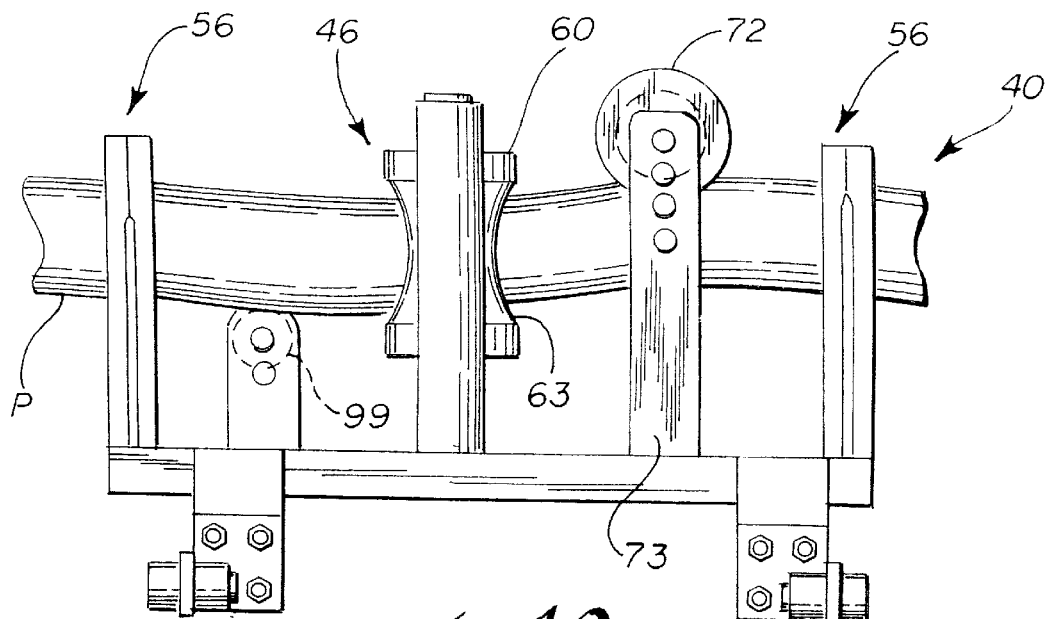
Figure 11:
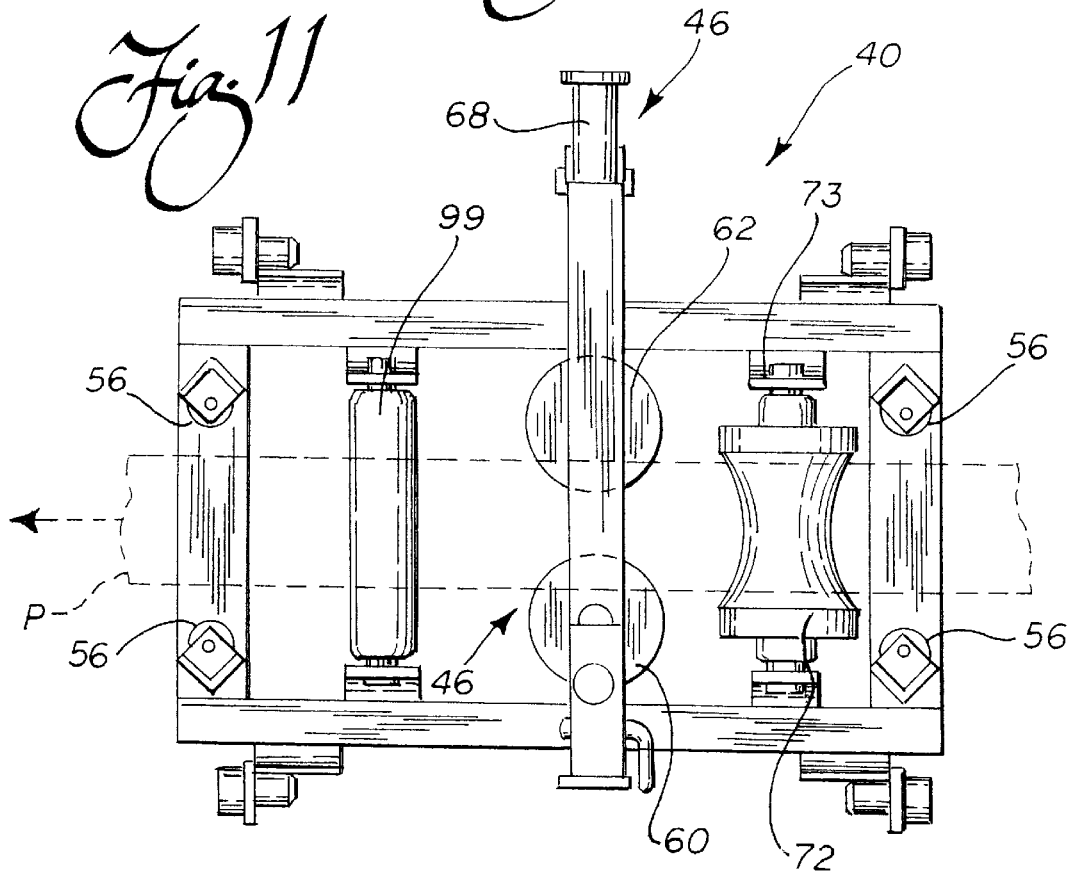

FIG. 9 shows a side view of a second alternative construction wherein a single adjustable retainer roller is provided for engaging an inner surface of the coil, sets of lower horizontal bumper rollers are provided on lower cross members of the trailer frame, and the pipe reforming assembly is modified such that the pipe straightening is completed as the transition is made from the cradle, upstream of a single horizontal straightener roller, and then into the rerounder;

FIG. 10 shows a side view of the pipe reforming assembly according to the second alternative construction shown in FIG. 9; and FIG. 11 is a top view of the pipe reforming assembly of FIG. 9 with the rerounder rollers engaging the sides of the pipe for compressing it back to roundness.

Reference will now be made in detail to the present preferred embodiment of the invention, an example of which is illustrated in the accompanying drawing.

DETAILED DESCRIPTION OF THE INVENTION

Figure 1:
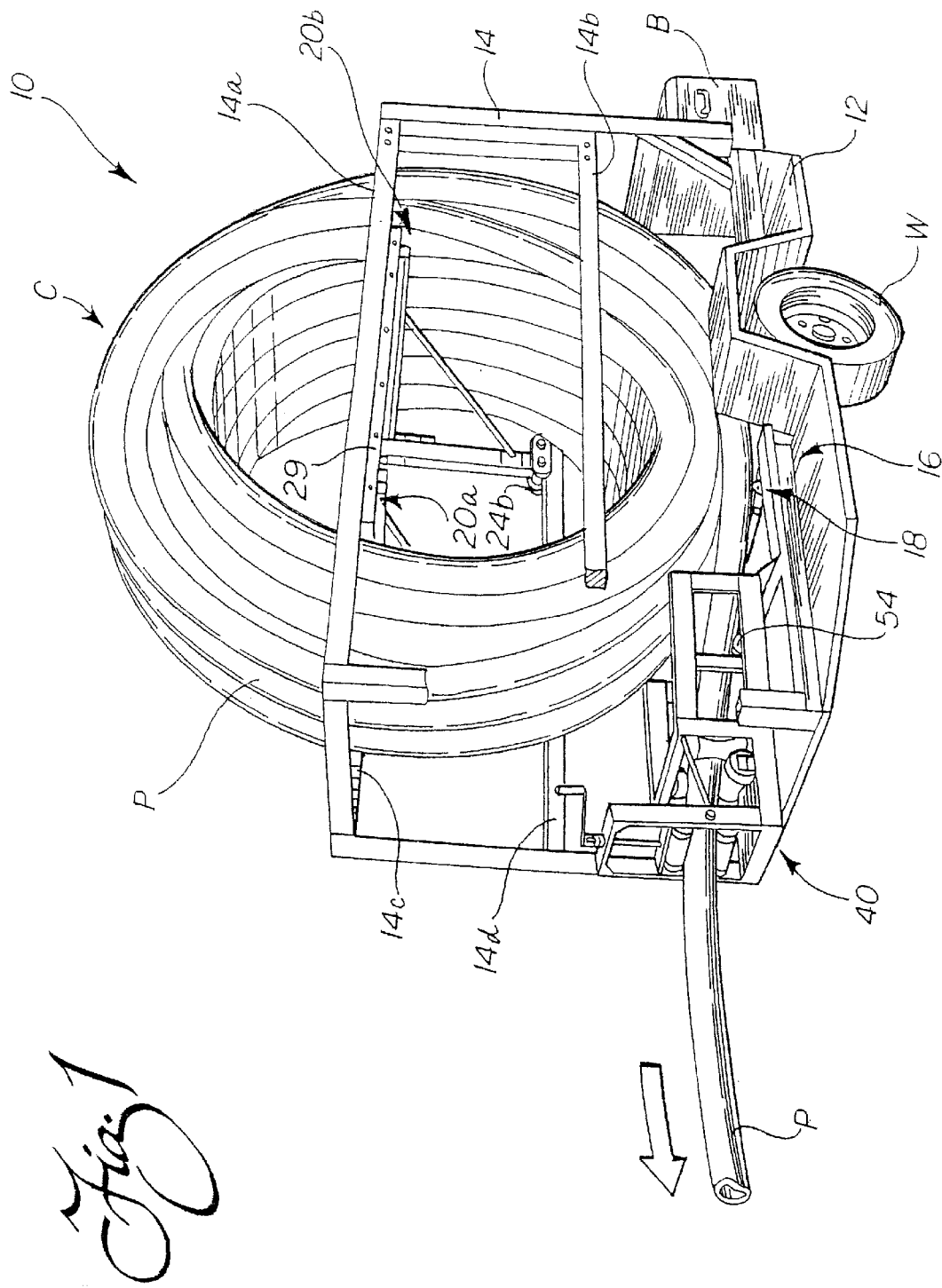
FIG. 1 is a perspective view of the trailer of the present invention having a coil mounted in the operative position for pipe payout.

Reference is now made to FIG. 1 illustrating a preferred embodiment of the improved trailer 10 of the present invention transporting a coil C of pipe P. The pipe P is typically formed of a flexible plastic material, such as polyethylene, with the cross-sectional diameter of the pipe dictating the size and weight of the coils. As will be appreciated upon reviewing the disclosure which follows, the trailer 10 of the present invention advantageously is adaptable to accommodate many standard sizes of coils, including those formed from pipe having a cross sectional diameter of between 2 and 6 inches. As one example, the six inch pipe is commonly used in laying natural gas lines, and comes in a 450 foot length which weighs approximately 2100 pounds.

The trailer 10 includes a base 12 having at least one set of wheels W which permit highway use. To provide braking function, the trailer 10 is preferably equipped with a self-contained brake assembly (not shown), such as that described in any one of U.S. Pat. Nos. 5,316,100, 5,411,120, 5,551,538, 5,622,241, and others. Brake assemblies of the preferred type are manufactured by Null's Machine and Manufacturing of Huntington, W. Va. Relatively wide running boards are provided on all sides of the base 12 to permit workers to stand on the trailer 10 when making adjustments, such as required during loading of the coil C. A hitch H is also provided for towing the trailer 10 behind a vehicle during transportation to and from the worksite. Spare parts, such as extra locking pins, or any tools needed for upkeep or minor repairs can be stored in an on board tool box B.

Mounted on the base 12 is a frame 14 formed from a plurality of horizontal cross members 14a, 14b and 14c, 14d that are attached to vertical members (not numbered) in a rectangular configuration. With the minor exceptions noted herein, it is preferred that all members forming the frame 14 are fabricated from lightweight, corrosion-resistant materials, such as aluminum alloys. Use of such materials serves the dual purpose of reducing the towing weight of the trailer, while obviating the need for painting or other types of surface treatment to avoid corrosion in the outdoor environment.

Figure 2:
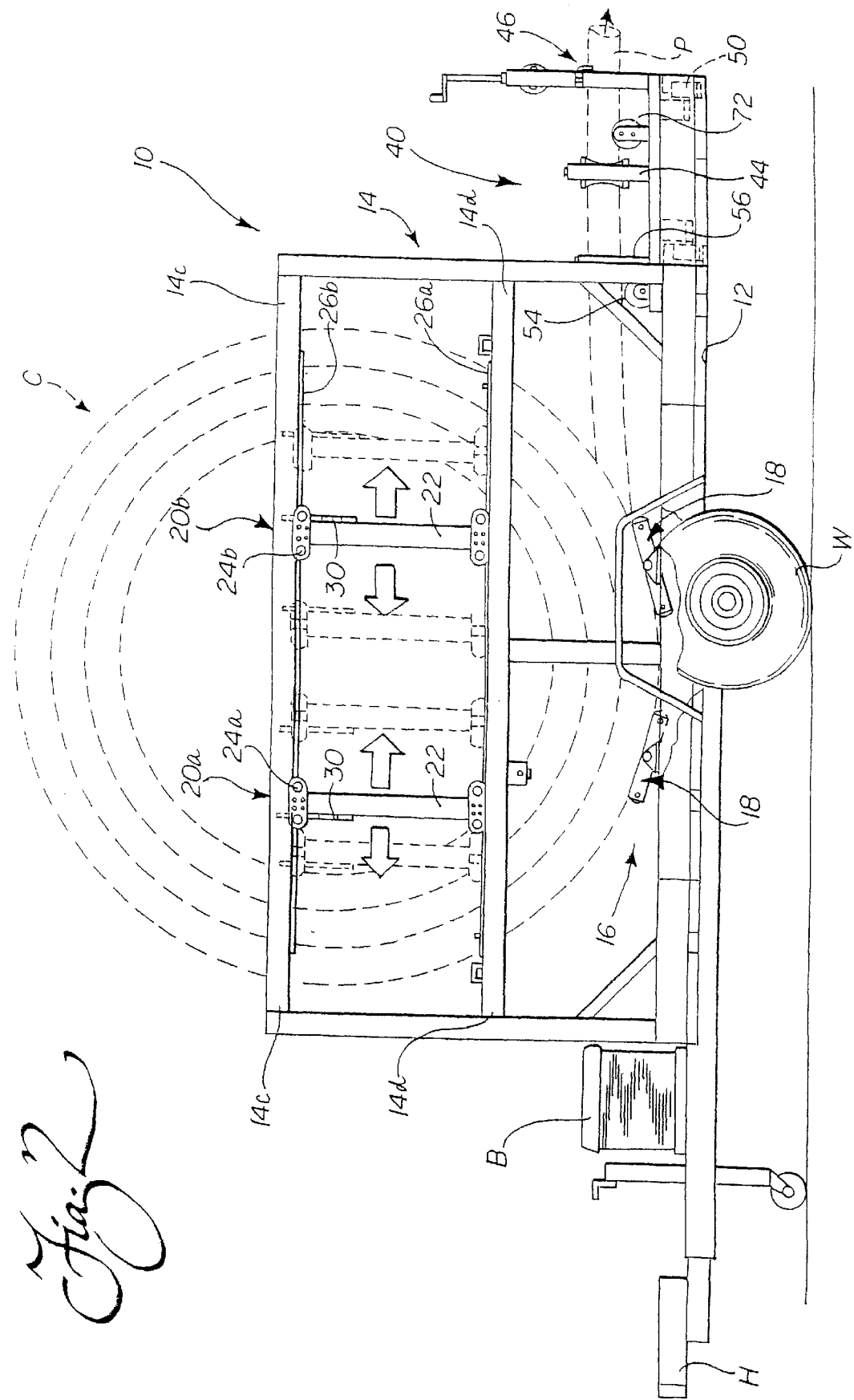
FIG. 2 is a side view of the trailer illustrating the cradle for supporting the coil, including the self-centering roller assemblies of the preferred embodiment, and the adjustable nature of the retainer rollers.
Figure 3:
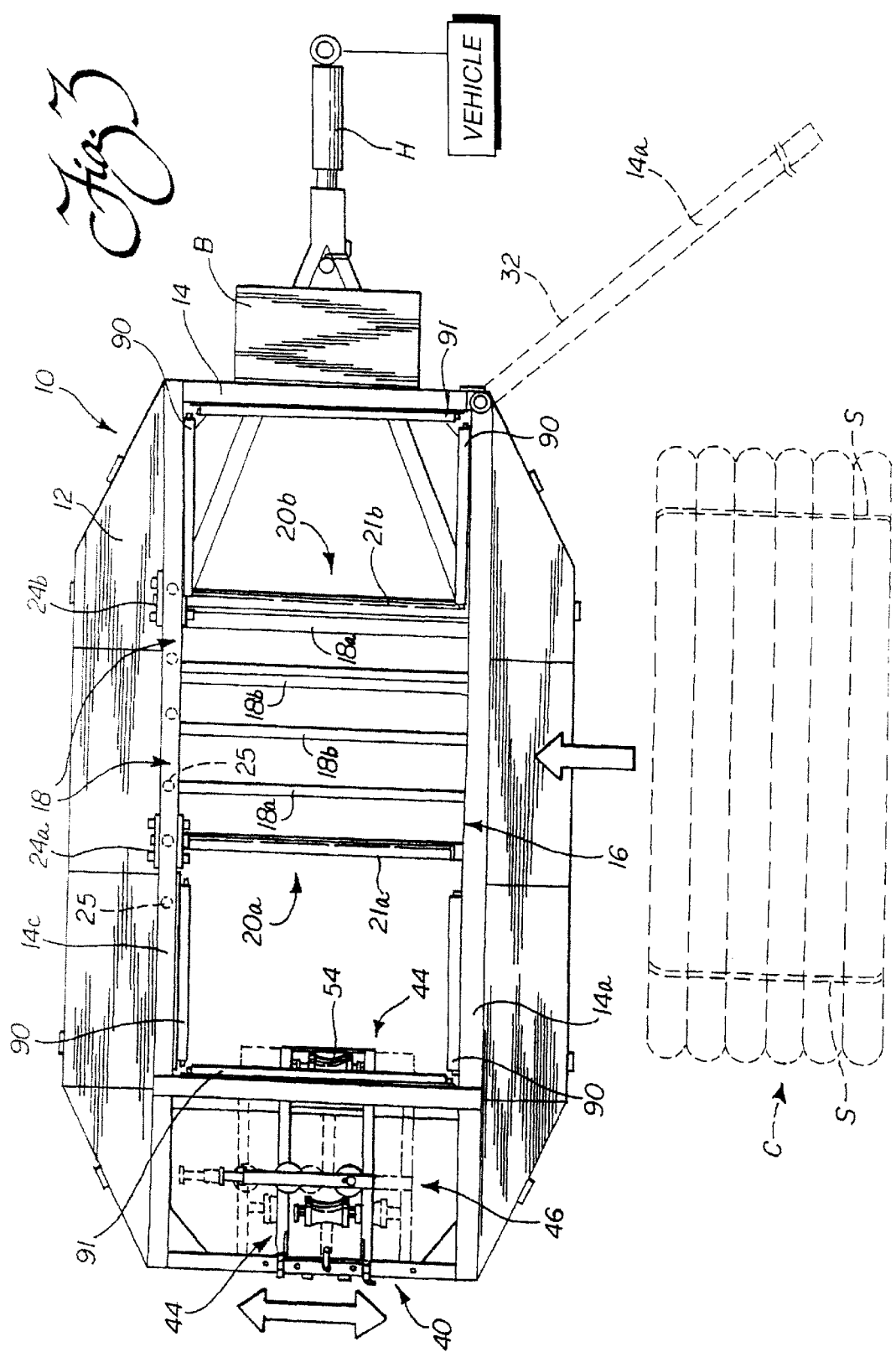
FIG. 3 is a top view of the trailer showing a phantom view of the swing out gate in the open position to permit easy loading of the coil onto the cradle and over the retainer rollers.
Figure 4:
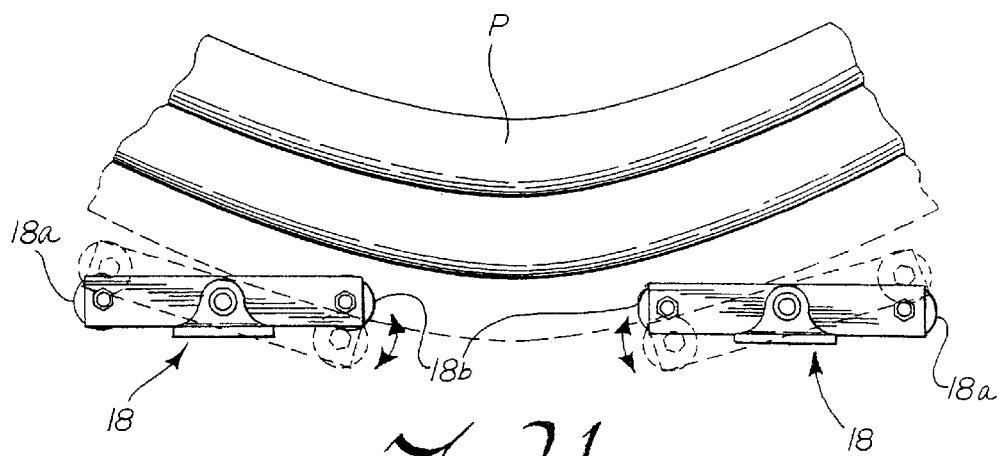
FIG. 4 is a close up view of the pivotally mounted self-centering roller assemblies of the cradle, which support the coil on its outer peripheral surface.

As illustrated in FIGS. 2 and 3, a cradle 16 supports the coil C on the trailer 10. In the preferred embodiment, the cradle 16 includes a pair of support roller assemblies 18 having elongated rollers 18a, 18b for contacting an outer peripheral surface of the coil C (see FIG. 3). The rollers 18a, 18b permit free rotation during the pipe laying operation. Thus, in the preferred embodiment, the roller assemblies 18 are pivotally mounted to provide automatic, self-centering action in response to the simple placement of the coil C in the cradle 16 (see action arrows depicting full line to dotted line movement in FIG. 4). This pivoting advantageously causes the roller assemblies 18a, 18b to automatically adjust into position to accommodate the several sizes of coils. Although a pair of roller assemblies 18 are illustrated, it should be appreciated that other types and numbers of roller-like elements may be used in the cradle 16 to provide the necessary rotatable support for the coil C. Examples include fixed rollers, adjustable rollers, fixed slat supports, transversely mounted wheels, or similar structures which would provide the necessary reel-free support for the coil, while permitting the smooth rotation required for pipe payout.

Upper retainers are provided for engaging an inner surface of the coil C. In the preferred embodiment, the upper retainers include assemblies 20a, 20b which support transverse retainer rollers 21a, 21b. These roller assemblies are positioned between upper horizontal members 14c, 14d forming one upper side of the frame 14 (see FIGS. 1–3) and are slidably mounted to permit movement of the rollers 21a, 21b into engagement with the respective inner surface of pipe coil C (see opposed action arrows in FIG. 2). More particularly, each retainer roller assembly 20a, 20b includes an upstanding post 22 having guide assemblies 24a, 24b mounted at the top and bottom. These guide assemblies 24a, 24b capture and roll along the upper and lower horizontal frame members 14c, 14d to provide the desired adjustability. To assure smooth operation, the guide assemblies 24a, 24b ride on stainless steel tracks 26a, 26b attached to the bearing surfaces of members 14c–14d. The opposite end of each transverse roller 21a, 21b is also fitted with a similar guide means (not shown) formed in the adjacent upper horizontal frame member 14a (see FIG. 3). Although the retainer roller assemblies 20a, 20b are positioned to engage the inner surface of the coil C for added stability and guidance, it should be understood that the weight of the coil C is at all times supported by the cradle 16.

To secure the roller assemblies 20a, 20b in the operative position, spring-loaded locking pin mechanisms 30 are provided adjacent to each upper guide assembly 24a, 24b. The pins of mechanisms 30 are selectively inserted into apertures 25 (shown in phantom in FIG. 3) formed in the underside of the upper horizontal member 14c. To secure the opposite ends of the rollers 21a, 21b in place, a transverse locking pin (not shown) is provided. Each locking pin is placed through one of a corresponding set of apertures formed in the adjacent frame member 14a and into a bore formed along the rotational axis of the each of the transverse rollers 21a, 21b. In both cases described above, the apertures for receiving the respective locking pins are spaced such that each pair corresponds to a standard coil diameter. The use of such manually operable locking mechanisms and locking pins advantageously obviates the need for tools which simplifies the coil loading process.

To facilitate loading of the coil C onto the cradle 16 and positioning of the roller assemblies 20a, 20b, the frame 14, including horizontal members 14a, 14b form a wing out gate 32 (open position shown in phantom in FIG. 3). As illustrated, the gate 32 is preferably hinged at one end to permit full 180° outward rotation (see arcuate action arrow in FIG. 3). The opposite end of the gate 32 is secured in place by a self-contained, easy-release latch or lock (not shown).

To receive, reform and assist in guiding the pipe P from the coil C into a trench, a pipe reforming assembly 40 is provided on board the trailer 10. The reforming assembly 40 of the preferred embodiment is positioned at the rear of the trailer 10 such that it receives the pipe P immediately as it unwinds from the coil C. As shown in FIGS. 2 and 3, the reforming assembly 40 is slidably mounted on the base 12, which allows it to track back and forth in response to the reciprocal motion of the pipe P to maintain alignment during unwinding from the coil C (see double headed action arrow in FIG. 3). More particularly describing the preferred mounting, each corner of the base frame 47 of the reforming assembly 40 is provided with a depending arm 48 (see FIG. 5). Wheels 50 mounted to the arms 48 extend outwardly from the base 47 and ride along a C-channel 52 on the trailer. Annular guide flanges 51 formed around the periphery of each wheel 50 assist in ensuring that the reforming assembly properly tracks along the C-channels 52.

Figure 5:
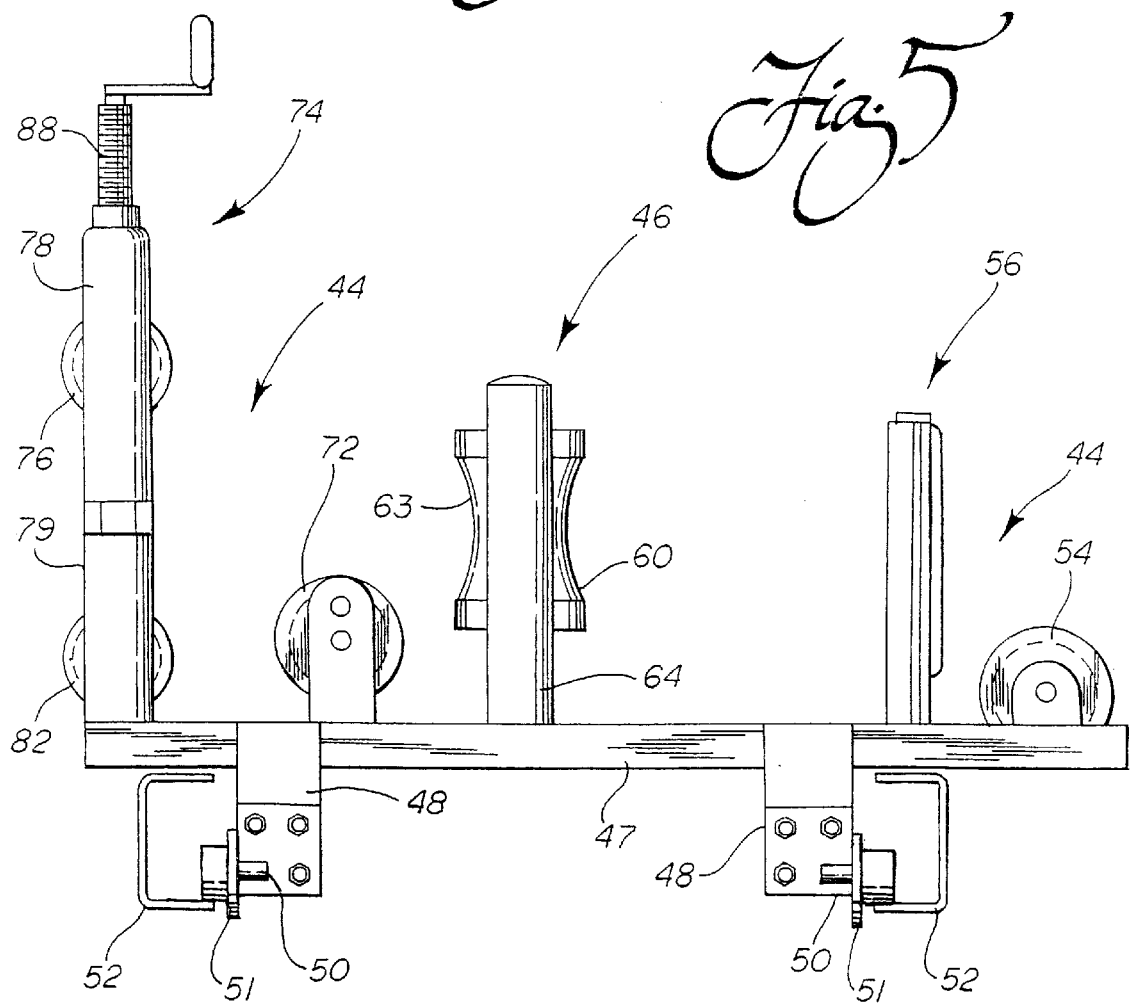
FIG. 5 is an enlarged side cutaway view of the pipe reforming assembly, particularly illustrating the sequence of the rollers and roller assemblies that serve to straighten and reround the pipe, and also showing the wheels that allow the reforming assembly to translate and follow the unwinding pipe as it moves across the coil.
Figure 5A:
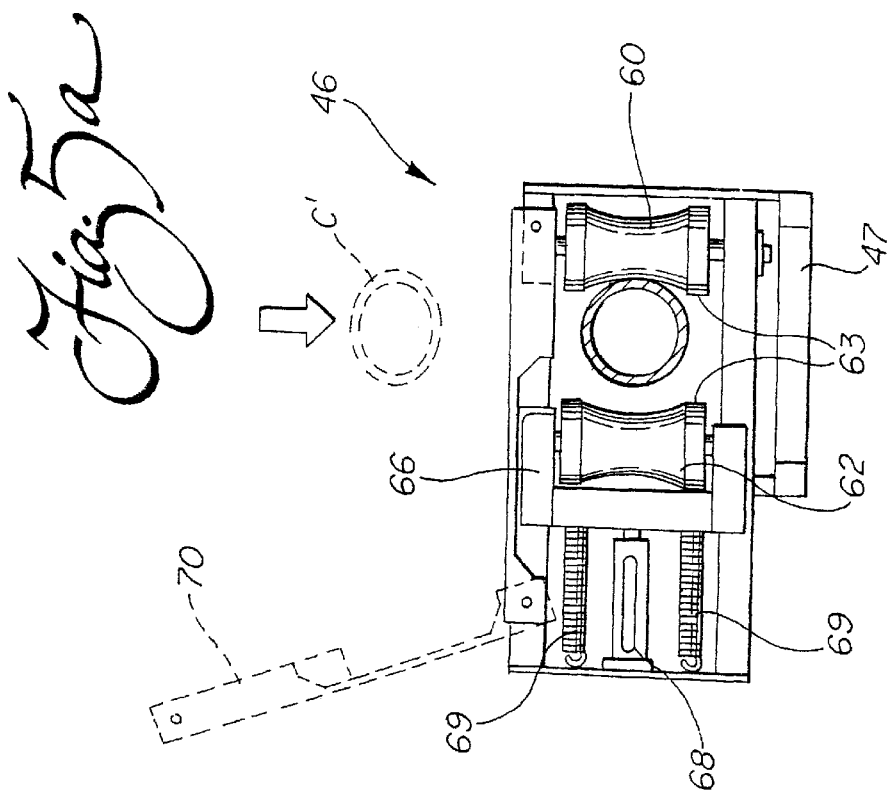
FIG. 5a is an enlarged front view of the rerounder, with a phantom depiction of the releasable top gate shown in the open position for easy pipe loading.
Figure 5B:
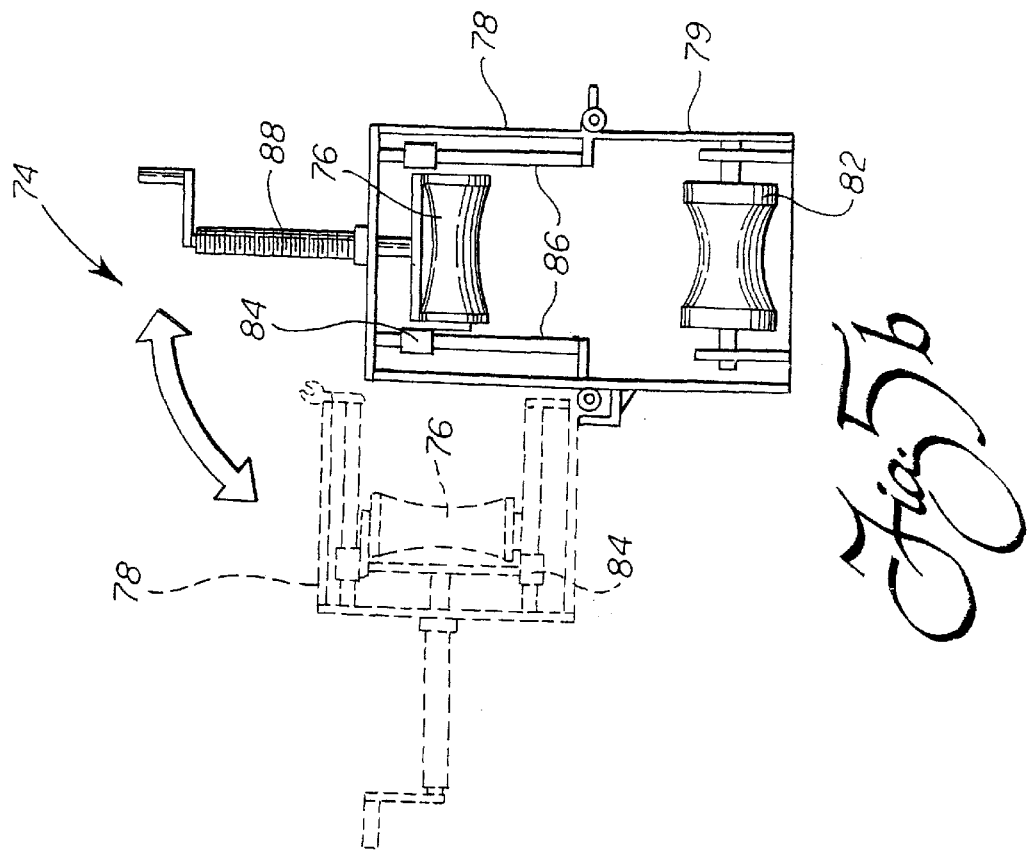
FIG. 5b is an enlarged front view of the deflection assembly forming a part of the straightener, including the releasable top portion that assists in the easy loading of the pipe.

Specific reference is now made in FIGS. 5, 5a, and 5b which show the straightener 44 and rerounder 46 of the pipe reforming assembly 40 in more detail. Referring to FIG. 5, the straightener 44 includes an initial horizontal bending roller 54 positioned upstream of the rerounder 46. This roller 54 is provided with an annular concave face for contacting the pipe P immediately as it unwinds and leaves the coil C (see FIGS. 1 and 2 also). The vertical height of the roller 54 is preferably such that it tends to deflect the pipe P in an upward direction as it transitions from the coil C and through the vertical guide rollers 56. As described in further detail below, passage of the pipe P over and through this combination of rollers induces an initial slight bend in the pipe P and begins the reforming process.

The rerounder 46 receives the pipe P after this initial straightening is completed and includes a pair of opposed upstanding rollers 60, 62 having annular concave faces and generally designated by reference numeral 63. One of these rollers 60 is fixed on the base 47 (see FIGS. 5 and 5a). The opposite roller 62 is adjustable and is slidably mounted on a subframe 66. Means for actuating the subframe 66 is provided to move the adjustable roller 62 toward the fixed roller 60 and compress the pipe P to remove the ovalness. In the preferred embodiment, a manually operable, self contained hydraulic jack 68 provides the force necessary to efficiently compress the pipe and remove ovalness. Dual springs 69 may be provided to retract the piston of the jack when the relief valve is opened. However, it should be appreciated that other types of manually operated or powered devices may be used to actuate the adjustable roller 62, such as a hydraulic jack powered by a separate hydraulic pump mounted on board of the trailer 10.

In addition to providing a compressive force for rerounding, it shoud be appreciated that the upstanding rollers 60, 62 of the rerounder 46 also assist in straightening the pipe P. More particularly, the concave faces 63 maintain a vertical holding force on the pipe P as it passes through the reforming assembly 40. This vertical force component assists in backbending the pipe P over the roller 54, as well as with respect to the remainer of the straightener components, as will be seen below.

The rerounder 46 is also provided with a releasable gate 70 that facilitates the easy loading and removal of the pipe P from between the rollers 60, 62 (open position shown in phantom in FIG. 5a). The gate 70 is hinged to the support frame 64 at one end. The opposite end is secured using a locking pin (not shown) or similar releasable attachment means.

In addition to the initial horizontal bending roller 54, the straightener 44 further includes a second horizontal bending roller 72 and a deflection assembly 74, both of which are positioned downstream of the rerounder 46. The second bending roller 72 also has a concave face which contacts the pipe P. The deflection assembly 74 includes a manually adjustable upper roller 76 mounted in the top portion 78 of a split frame 80 and a lower, contact roller 82 that is secured in the bottom portion 79 of the frame 80. Both of these rollers 76, 82 also have concave faces. As described further below, the transition from the second bending roller 72 to the rollers 76, 82 of the deflection assembly 74 completes the backbending in the pipe P, which reverses the memorized bending moment and straightens the pipe.

To allow for adjustments to be made to the amount of vertical deflection created by the deflection assembly 74, the upper roller 76 is secured in a subframe 84 slidably mounted on a pair of spaced guide tracks 86 forming a part of the top portion 78 of the frame 80. Manual adjustment of the vertical position of the upper roller 76 relative to the lower roller 82 is made using a jack screw 88 threaded through the top wall of the frame 80 and secured to the slidable subframe 84. To facilitate loading of the pipe P between the rollers 76, 82 of the deflection assebmly 74, the top portion 78 of the frame 80 is released from the bottom portion 79. More particularly, one end of the top portion 78 is hinged and the other is releasably secured in place using a locking pin or similar arrangement. In the open position, the top portion 78 rotates about the hinge such that the pipe P can be placed directly on the lower roller 82. It should be appreciated that the proposed hinged design provides for ease of operation in loading the pipe P in the straightener 74 in the same manner as the gate 70 acts with respect to the rerounder 46.

To furhter assist in ensuring that the coil C freely rotates during unwinding, the inner surfaces of the members 14a–14d forming the frame 14 are preferably provided with a plurality of horizontally extending bumper rollers 90. These bumper rollers 90 provide rolling contact for the periphery of the coil C and thereby reduce the frictional forces which would otherwise be present if the coil C were permitted to bump into or inadvertently rides against the aluminum frame members 14a–14d. Additionally, horizontal bumper rollers 91 positioned parallel to the axis of rotation at each end of the frame 14 may be provided as a precaution in the event that the coil C is slightly oversize, it rocks out of its normal cradled position due to binding during uncoiling, and/or the trailing end of the pipe flies free when the final few feet are uncoiled. Optional vertical bumper rollers (not shown) may be positioned on the vertically extending members of frame 14 or mounted between the horizontal frame members 14a, 14b and 14c, 14d for the same purpose.

The loading of the coil C onto the trailer 10 can now be described in detail. Referring first to FIG. 2, the locking mechanisms 30 and the transverse locking pins (not shown) are released to allow the retainer roller assemblies 20a, 20b to roll on their respective wheel assemblies 24a, 24b to a center position (see action arrows pointing towards each other in FIG. 2). Once in the retracted position, the gate 32 is unlocked and swung out to expose both the lower support roller assemblies 18 formimg the cradle 16 and the retainer roller 20a, 20b. The coil C is then loaded onto the support roller assemblies 18 using a forklift or similar lifter. Once the coil C is in place, the gate 32 is closed and locked securely in place. The retainer rollers 20a, 20b are then moved into position (see outwarly pointing arrows) for engaging the inner surface of the coil C. It should be appreciated that in this position, the coil C freely rests in the cradle 16 and is freely rotatable such that a single operator can initiate the unwinding of the pipe P for laying in the trench.

It is common for coils C to be delivered for use having a plurality of plastic straps S of the type commonly used in the art to hold the pipe P in the coil formation (see FIG. 3). Thus, the first few straps holding the free end of the pipe P must be manually cut in order to free the end of the pipe P for feeding through the reforming assembly 40. However, it should be appreciated that with the trailer 10 of the present invention, the remainder of the straps S on the coil interior may simply be left on the coil. During the unwinding operation, these straps S are automatically broken by the spreading force of the pipe as it unwinds and is pulled through the reforming assembly 40.

To feed the pipe P through the reforming assembly 40, the gate 70 of the rerounder 46 is released, as well as the top portion 78 of the deflection assembly 74 (see phantom outlines of FIGS. 5a and 5b). The lead end of the pipe P having coil set (see phantom line pipe C' in FIG. 5a) is then guided over the initial horizontal bending roller 54, between vertical guide rollers 56, and down to a position between the rerounder rollers 60, 62 (see dotted line position of FIG. 5a, and the accompanying action arrow). The pipe P is then pulled over the second bending roller 72 and down over the lower roller 82 of the deflection assembly 74.

Once in position, the gate 70 on rerounder is closed and the hydraulic jack 68 manually actuated and adjusted to provide the necessary compression to remove ovalness from the pipe P unwinding from coil C. The top portion 78 of the deflection assembly 74 is also closed over the pipe P and the screw 88 is manually operated to press the upper roller 76 into contact with the upper surface of pipe P. Adjustments are then made to provide the desired degree of deflection and backbending necessary to remove curvature from the pipe P and complete final straightening prior to payout. As is known in the art, the free end of the pipe P is then capped for connection to a front-loader, excavator, or similar apparatus for pulling it into the trench.

As should be appreciated, the coil C is preferalby stored on the trailer 10 between jobs, with the pipe P remianing secured in the reforming assebmly 40. If it becomes necessary to remove the coil C from the trailer 10, such as for replacement with a full coil or one of a different size, the pipe P is removed from the reforming assembly 40 by reversing the procedure described above. More specifically, the hydraulic jack 68 and screw 88 are manually released to remove the respective compressive force and downward deflection acting on the free end of the pipe P. The top portion 78 of straightener 44 is then released, as is the gate 70. The pipe P may then be fed back through the reforming assembly 40 by reverse rotation of the coil. The pipe P is then secured to the coil C. To complete this process, the retainer rollers 20a, 20b are unlocked and moved to the center position, the swing-out gate 32 is opened, and the coil C is lifted from the cradle 16.

FIGS. 6–8 show alternative constructions that are currently contemplated. Specifically, FIG. 6 shows an alternative construction in which spring loaded horizontal bumper rollers 90 provide constant pressure against the top of the coil C. The rollers 90 are preferably mounted on the top cross member(s) 14c of the trailer 10 (see FIG. 8) using spring loaded hinges 91 on each side (see FIG. 6). These hinges 92 hold the rollers 90 firmly against the top of the coil C at all times. This helps to keep the pipe P wound in the coil C and prevents binding. The spring loaded hinges 92 are preferably independent of one another to adjust for small variations in coil diameters, and for adjustment to allow the rollers to adapt to different basic coil diameters.

FIG. 7 shows an alternative cradle construction in which vertical rollers 94 are added to prevent the pipe P from slipping off the cradle rollers 18a near the bottom of the coil C. As shown, at least one of the rollers 94 may optionally be equipped with squeezing means 96. The roller 94 mounted adjacent to the squeezing means 96 is positioned generally vertically, as viewed from the side (see FIG. 8), but set at a slight angle of about 10°, when viewed along the longitudinal axis of the trailer, as shown in FIG. 7. The squeezing means 96 is illustrated as a jack screw 97 so that the roller 94 can move in the direction indicated by arrows in FIG. 7 to press against the side of the coil C. Preferably, the bracket supporting the roller 94 is spring loaded relative to the screw 97. The screw 97 thus moves the roller into firm engagement, but the spring ensures that the screw is not urged too tightly against the coil C.

FIG. 7a shows additional features of the cradle construction according to FIG. 7. In particular, as the coil C is lowered into the trailer 10, the bottom sets of rollers 18a, 18b forming the cradle 18 adapt to accommodate the diameter of the coil C. The rollers 18a, 18b are pivotally mounted in pairs so that as one roller pair 18b is forced down, the other pair 18a is forced upward against the coil C to provide support. By virtue of this construction, four rollers support the weight of the coil C at all times.

FIG. 8 shows, somewhat schematically, a side view of a first alternative construction of the trailer 10. The construction is similar to that of FIG. 2 with several exceptions. The movable roller assemblies 20a, 20b extending across the top of the trailer 10 with the retainer rollers inside the coil C have been eliminated. These are replaced by middle inside retainer rollers 21a, 21b manually attached at both ends to the center rails 14d of the trailer by mounting strips 98 with spaced mounting holes. The cradle 16 mounted across the bottom of the trailer 10 has the two sets of rollers 18 and the vertical squeezer rollers 94 of the type described above in connection with FIGS. 7–7A. This arrangement helps distribute the weight of the pipe coil C. The location of the rollers, including the inner retainer rollers 21a, 21b and the upper spring loaded bumper rollers 90 of FIG. 6, are shown in FIG. 8. The upper bumper rollers 90 are preferably set at an angle and spring loaded to accomodate any variations in the coils and various sizes of pipe. In the preferred embodiment of this alternative construction, there are a total of four spring loaded bumper rollers 90.

A second alternative construction in shown in the FIGS. 9–11. Specifically, FIG. 9 is a side schematic view of the trailer 10 wherein the cross members 14a–d (only 14a and 14b shown) are angled and connect to a vertical member at each end of the trailer frame. Each cross member 14a–14d is provided with a spring loaded bumper roller 90 (only four on one side are shown). These rollers ensure smooth rotation of the coil C. Preferably, the bumper rollers 90 are mounted so as to project inwardly at an angle to ensure that contact is made with the outer side surfaces of the coil C as it rotates on the cradle 16. Additionally, a single inner retainer roller 21a is provided extending across the trailer between the lower cross members 14b, 14d. The retainer roller 21a is adjustable along the mounting strips 98 (only one shown) so that it can be moved into engagement with the inner surface of the coil C.

Another aspect of this second alternate construction is a modification in the reforming of the pipe during pay-out. As best shown in the side view of FIGS. 9 and 10, the pipe reforming assembly 40 is modified such that straightening of the pipe is completed as the transition is made from the coil C. Specifically, the pipe P is forced to bend downwardly against the curvature of the coil set. The start of the backbending action occurs as it exits the coil C, passing over the cradle roller(s) 18a, 18b. The weight of the coil C and the retainer roller 21a assist the bending roller 72. Specifically, the pipe P is forced down as it exits the coil against these cradle rollers, especially the last roller 18a. The straightening by backbending between these rollers can be best seen in FIG. 9 (note action arrows A). The need for the deflection assembly 74 for downstream straightening in the previous embodiment is completely eliminated. The pipe then passes through opposed vertical rollers 56 that merely serve as a guide and prevent binding (see FIG. 11).

The bending roller 72 is thus a portion of the straightener, as it works in conjunction with the cradle. It is height adjustable along a mounting bracket 73 and has an annular concave face for contacting the upper surface of the pipe. This causes the pipe to be centered as it is forced downwardly.

From the bending roller 72, the pipe P enters and passes through the rerounder 46, which includes upstanding rollers 60, 62 also having annular concave faces 63. As noted in detail above, the rerounder rollers 60, 62 not only compress the pipe P to remove ovalness, but also provide a vertical holding force by virtue of the concave faces 63. As should be appreciated, this holding force also assists in backbending the pipe P in the transition area. Indeed, it has been discovered that the use of a single horizontal bending roller 72 for contacting the upper surface of the pipe P and the cradle roller(s) 18a, 18b for contacting the bottom surface for the other portion of the straightener is all that is needed. Performing the entire straightening between the cradle 16 and the rerounder 46 allows a more efficient overall operation. Eliminating having to pass through the deflection assembly 74 to provide backbending and straightening after rerounding substantially reduces the power requirements for pulling the pipe P as it is laid in the trench. Advantageously, the pipe P is simply passed over a horizontal guide roller 99 and through vertical guide rollers 56 after it leaves the rerounder 46 for directing it into the trench, or the like. This arrangement greatly reduced the overall complexity of the design to also provide lower manufacturing and maintenance costs. Furthermore, the effort required during the loading of the pipe P in the reforming assembly 40 is minimized.

In summary, an improved trailer 10 is provided for transporting coiled pipe C and for assisting in the unwinding of the pipe P for laying in a trench. A key improvement over the prior art trailers is the provision of support for the coil C by a cradle 16. This feature obviates the need for the troublesome reel or spool that is characteristic of prior art trailers. The cradle 16 includes self-centering support rollers 18 upon which the coil C freely rotates during the pipe laying operation (see FIGS. 2 and 4). In one embodiment, upper retainer roller assemblies 20a, 20b having transverse rollers 21a, 21b are proivded for engaging the inner surface of the coil C. The position of the retainer roller assemblies 20a20b is adjustable to accommodate different diameter of coil C (see FIG. 2). To both guide and remove coil set (bending/ovaling) from the pipe P as it unwinds from the coil C, a reforming assembly 40 is provided which includes a straightener 44 and a rerounder 46 (see FIGS. 1 and 2). The pipe reforming assembly 40 is slidably mounted on the trailer 10 for tracking the reciprocal motion of the pipe P during unwinding from the coil C (see FIG. 3). To facilitate loading of the pipe P, the straightener 44 has a releasable top portion 80 and the rerounder 46 has a releasable gate 70 (see FIGS. 5a and 5b). In an alternative construction, the straightener includes simply a single horizontal bending roller 72, and the cradle roller(s) 18a, 18b, so that full straightening occurs as the pipe P transitions from the cradle 16 to the rerounder 46 in the reforming assembly 40. Together, these combined improvement features and others, provide a highly efficient operating apparatus for transporting a coil of pipe and assisting in unwinding pipe for laying in a trench, that is also simple and relatively low cost in design.

The foregoing description of a preferred embodiment of the apparatus of the present invention has been presented for purposes of illustration and description. It is not intended to be exhaustive or to limit the invention to the precise form disclosed. Obvious modifications or variations are possible in light of the above teachings. For example, it is possible for the trailer to be adapted to carry several reserve coils of pipe, with only the single coil positioned for unwinding at one time, as shown. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for transporting a coil of pipe and assisting in unwinding the pipe, comprising:
   a base;
   a cradle adjacent said base for contacting an outer surface of and supporting the coil;
   a frame mounted on said base, said frame supporting at least one upper retainer for engagement with a surface of the coil; and
   a pipe reforming assembly positioned adjacent said base including a rerounder and at least a portion of a straightener for the pipe unwinding from the coil;
   whereby the coil is supported by said cradle as the pipe unwinds, retained in the cradle by said retainer, and reformed by said rerounder and said straightener.

2. The apparatus according to claim 1, wherein said cradle comprises at least two support roller assemblies pivotally mounted on said base, said support roller assemblies pivoting in response to contact with the outer surface of the coil to provide self-centering action.

3. The apparatus according to claim 1, wherein said pipe reforming assembly is mounted to translate along said base and track in response to the transverse reciprocal motion of the pipe unwinding from the coil.

4. The apparatus according to claim 3, wherein said rerounder further includes a pair of opposed upstanding rollers for first receiving and compressing the pipe in a first direction to remove ovalness, at least one of said rollers being adjustable in said first direction for varying the compressive force applied to the pipe; and
   said straightener further includes an initial horizontal bending roller, a second bending roller, and a deflection assembly for inducing a backbend in the pipe to remove coil set, said deflection assembly being adjustable for setting the vertical deflection of the pipe passing therethrough.

5. The apparatus according to claim 4, wherein said deflection assembly includes an adjustable upper roller that is mounted in a top portion of a split frame, whereby adjustment of said upper roller deflects the pipe over said second bending roller and provides final straightening of the pipe.

6. The apparatus of claim 5, wherein said deflection assembly further includes in said split frame a bottom portion for supporting a lower roller, said top portion being releasably hinged to said bottom portion for facilitating loading of the pipe.

7. The apparatus according to claim 4, wherein said pipe reforming assembly further includes a pair of vertical guide rollers positioned upstream from said rerounder, whereby said upstanding guide rollers receive the unwinding pipe, guide the pipe into the rerounder, and assist in unwinding said pipe from the coil by tracking the reciprocal motion of the pipe to maintain alignment of the reforming assembly.

8. The apparatus according to claim 1, wherein said rerounder includes upstanding rollers having concave faces for compressing the pipe and producing a vertical holding force on the pipe.

9. The apparatus according to claim 8, wherein said rerounder further inlcudes a hydraulic jack for actuating said adjustable roller to provide a compressive force against the pipe.

10. The apparatus according to claim 8, wherein said rerounder further includes a releasable gate for providing access to said pair of opposed upstanding rollers to facilitate loading of the pipe.

11. The apparatus according to claim 1, wherein said frame further includes a swing out gate for facilitating loading of the coil on said cradle and positioning of said upper retainer.

12. The apparatus according to claim 1, wherein said retainer includes first and second upper retainer rollers slidably mounted on said frame, said retainer rollers being secured in place on said frame, whereby said retainer rollers are selectively adjustable for engaging coils of pipe having different outer diameters.

13. The apparatus according to claim 1, wherein said frame is provided with a plurality of bumper rollers for engaging the outer surfaces of the coil, said bumper rollers facilitating rotation of the coil on said cradle.

14. The apparatus according to claim 1, further including at least two wheels mounted to said base and a hitch for towing said wheeled base behind a vehicle.

15. The apparatus according to claim 1, wherein said straightener portion includes a horizontal bending roller for contacting an upper surface of the pipe, said straightener further including at least one cradle roller for supporting said coil so as to provide straightening of the pipe as it transitions from said cradle to said reforming assembly;

said rerounder further including a pair of opposed upstanding rollers having concave faces for receiving the pipe passing under the bending roller, said opposed rollers compressing the pipe to remove ovalness.

16. An apparatus for transporting a coil of pipe and assisting in unwinding the pipe for laying in a trench, comprising:

means for transporting the coil;

means for cradling an outer surface of and rotatably supporting the coil on said coil transporting means;

means for engaging a surface of and retaining the coil in position on said coil transporting means; and means for straightening and rerounding the pipe during unwinding from the coil.

17. A reformer apparatus for straightening and rerounding pipe feeding from a coil and into a trench, comprising:

a straightener including an initial horizontal bending roller for receiving pipe unwinding from the coil;

a rerounder including a pair of opposed upstanding rollers for receiving and compressing the pipe, said rollers having concave faces which provide a vertical holding force for assisting in bending the pipe over said bending roller to provide initial straightening;

said straightener further including a second horizontal bending roller downstream from said rerounder and a deflection assembly for receiving the pipe from said second bending roller, said bending roller and said deflection assembly providing backbending to provide final straightening prior to the laying of the pipe in the trench.

18. The reformer apparatus according to claim 17, wherein said deflection roller assembly is provided with a lower roller and a manually adjustable upper roller for adjustment of the bending action and that is releasable to facilitate loading and unloading of the pipe.

19. The reformer apparatus according to claim 18, wherein said upper roller is mounted in a top portion of a frame assembly, said top portion hinged to a bottom portion of said frame assembly for moving said upper roller from an operative position to permit loading and unloading of the pipe in the straightener.

20. The reformer apparatus according to claim 17, wherein said rerounder further includes a hydraulic jack for compressing one of said opposed upstanding rollers against the pipe to assist in straightening and to remove ovalness.

21. The reformer apparatus according to claim 17, wherein said straightener and said rerounder are mounted to track the transverse, reciprocal motion of the pipe to maintian alignment during unwinding from the coil.

* * * * *

UNITED STATES PATENT AND TRADEMARK OFFICE
CERTIFICATE OF CORRECTION

PATENT NO.   : 6,419,424 B1
DATED        : July 16, 2002
INVENTOR(S)  : Robert L. Null et al.

It is certified that error appears in the above-identified patent and that said Letters Patent is hereby corrected as shown below:

<u>Title page,</u>
Item [57], ABSTRACT,
Line 1, please replace "tailer" with -- trailer --.

Signed and Sealed this

First Day of July, 2003

JAMES E. ROGAN
*Director of the United States Patent and Trademark Office*